May 26, 1964 A. SCHURRA 3,134,375
PUSH START MOWER
Filed Aug. 25, 1961
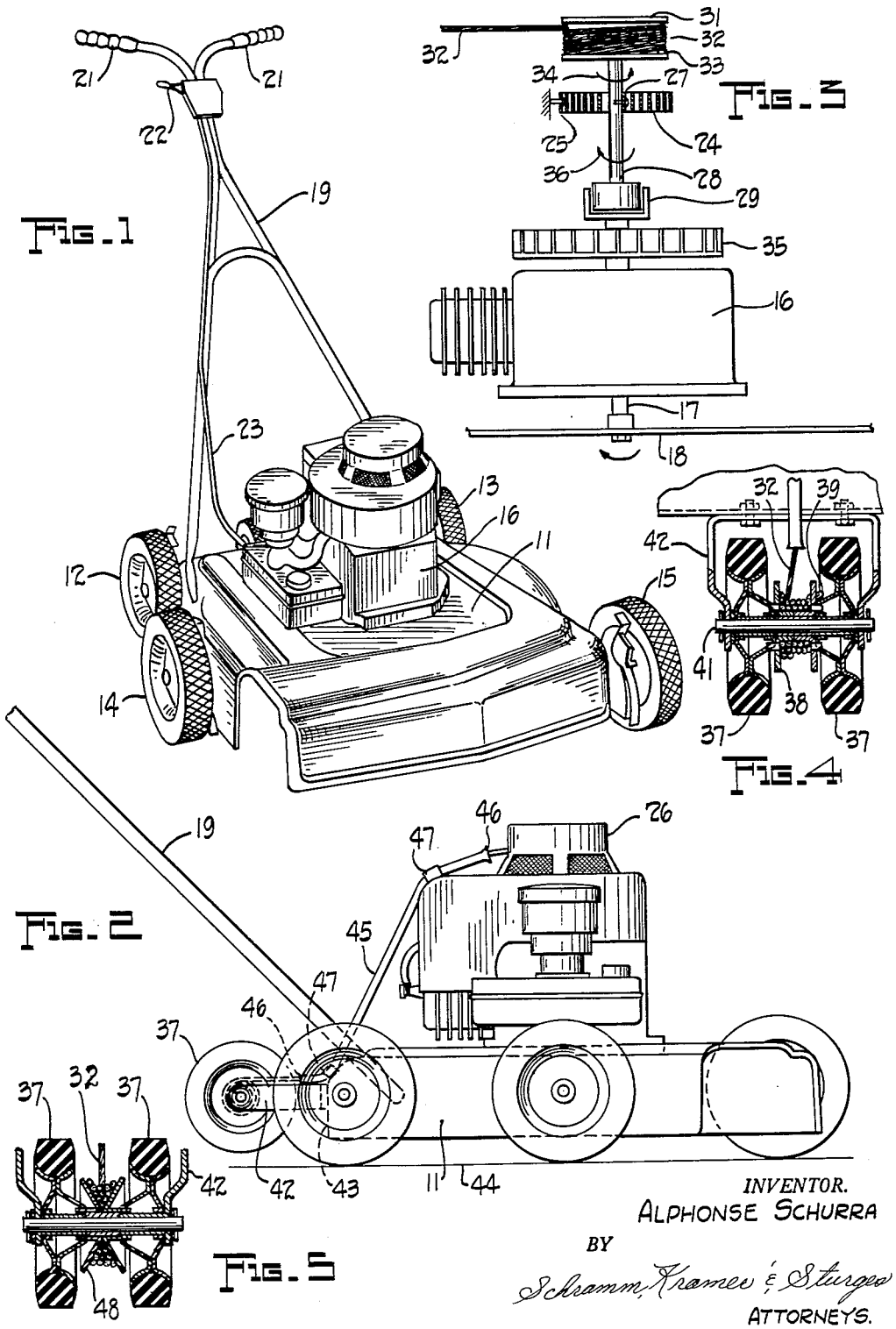
INVENTOR.
ALPHONSE SCHURRA
BY
Schramm, Kramer & Sturges
ATTORNEYS.

3,134,375
PUSH START MOWER
Alphonse Schurra, Cleveland, Ohio, assignor to
M.T. & D. Company, Cleveland, Ohio, a corporation of Ohio
Filed Aug. 25, 1961, Ser. No. 133,836
7 Claims. (Cl. 123—179)

This invention relates to starting arrangements for internal combustion engines of the portable type, particularly those mounted on wheeled tools.

An object of the invention is to facilitate the starting of the internal combustion engines for wheeled tools of the walking type.

A further object of the invention is to provide an improved internal-combustion-engine driven rotary mower.

A further object of the invention is to enable a wheeled tool having an internal combustion engine for operating it to be started in operation readily by pushing the wheeled tool in either direction for a short distance.

Still another object of the invention is to provide simple, durable, inexpensive, easily manufactured and maintained and easily utilized starter arrangements for moveable engine driven tools which obviate the necessity for strength or skill in starting the internal combustion engine.

Other and further objects, features and advantages of the invention will become apparent as the description proceeds.

In carrying out the invention in accordance with the preferred form thereof as in a walking type of rotary mower having a handle for pushing the mower over the ground and an engine mounted on the mower, an impulse type engine starter is provided. The impulse type engine starter is in the form of a spiral spring connected to the engine shaft by a one-way clutch. A pair of starter wheels are mounted at the rear of the mower under the handle in such a position that they are normally above the ground but are adapted to engage the ground when the handle is tilted down. A rope winding reel is connected to the starter wheels, preferably mounted between them and a drum is connected to the impulse starter.

There is a rope normally wound upon the drum and having ends fixed to the drum and to the reel, respectively, so that the rope may be unwound from the drum to the reel by tilting the mower handle down with the starter wheels engaging the ground and pushing the mower either forward or backward to wind the rope onto the starter reel. This winds up the spring of the impulse starter and stores energy which causes the engine to be turned over for starting it when the handle is released to release the starting wheels from engagement with the ground.

A better understanding of the invention will be afforded by the following detailed description, considered in conjunction with the accompanying drawing, in which:

FIG. 1 is a perspective view of a walking-type, rotary-blade, vertical-shaft mower driven by an internal combustion engine;

FIG. 2 is a side elevation of the mower of FIG. 1 illustrating the location of the starter wheels in relation to the impulse starter and starter rope;

FIG. 3 is a schematic diagram explaining the principle of operation of the impulse starter;

FIG. 4 is a view partially in cross-section of the starter wheels and starter-rope winding reel represented as cut by a horizontal plane; and FIG. 5 is a view corresponding to FIG. 4 illustrating a modified construction of starter reel.

Like reference characters are utilized throughout the drawing to designate like parts.

As shown in FIG. 1, the invention may be applied to a conventional type of rotary mower having a mower deck 11 mounted on four running wheels, including two rear wheels 12 and 13 and two front wheels 14 and 15, which latter may or may not be off-set according to the type of mower with which the invention is employed. A conventional internal combustion engine 16 is provided having a vertical shaft 17 carrying a conventional grass cutting blade 18. The mower also employs a conventional handle 19 secured to the mower deck 11 at such an angle as to provide grips 21 at a convenient height for an operator walking behind the mower. The handle also carries a conventional choke and throttle control 22 connected to the engine 16 in suitable manner as by means of Bowden wires 23.

Small internal combustion engines such as the engine 16 customarily provided for small garden tools or the like, such as mowers, ordinarily are not provided with starting batteries and electric starting motors. It has been customary to provide starting ropes adapted to be wrapped around a drum on the engine shaft with a knot at the end of the rope to fit into a notch in the drum so that the engine may be turned over for starting by pulling out the rope, whereupon the knot slips out of the notch when the rope has been unwound and the rope comes clear in the event that the engine starts. Even for small horse-power engines, however, starting an engine in this fashion requires some strength and a reasonable amount of skill in accelerating the engine sufficiently so that it starts before the rope is unwound.

Recoil starters have also been employed in which the rope rewinds upon the drum after starting operation so that it is ready for the next effort, but the rope must still be pulled out with the requisite force and speed in order to start the engine. A type of impulse starter has also been proposed in the form of a spring motor having a spring connected at one end to a winding handle and at the other end to the engine shaft. To start the engine it is necessary to block it so it does not turn while the spring is being wound up by the crank and then to unblock the engine with the crank handle blocked.

In accordance with the invention an impulse starter spring is also employed but it is permanently secured at one end to the engine housing.

As shown schematically in FIG. 3, there is an impulse starting spring 24, the outer end of which 25 is permanently secured to a suitable point (not shown) within the starter housing 26. The inner end 27 of the spring 24 is secured to a vertical shaft 28 aligned with the engine shaft 17 and connected thereto by a one-way clutch 29 which is schematically indicated. Since the one-way clutch 29 is not a part of the present invention and may be of conventional construction, the details thereof are not illustrated.

The shaft 28 also carries a drum 31 upon which is wound a starting rope 32, the end 33 of which is secured to the drum 31. Assuming that the rope 32 is wound upon the drum 31 as shown and that the spring 24 is wound up or tightened when the shaft 28 is rotated in the direction of the arrow 34, the one-way clutch 29 is so arranged that it engages the engine shaft 17 and its fly wheel 35 when the spring 24 unwinds and the shaft 28 rotates in the clockwise direction (as seen from above) indicated by the arrow 36.

For quickly and easily unwinding the rope 32 from the drum 31 against the force of the spring 24 in order to store mechanical energy therein for starting the motor 16, a so-called "fifth wheel" or pair of starting wheels 37 are provided which are adapted to engage the ground when the mower is tilted. The wheels 37 have secured thereto a starting reel 38 to which the opposite end 39 of the starting rope 32 is connected.

As shown in FIG. 2, the starter wheels 37 are mounted upon a shaft 41 carried by a backwardly projecting bracket 42 secured to the rear edge 43 of the mower deck 11. The arrangement is such that the wheels 37 are normally located slightly above the surface 44 of the ground when the running wheels 12, 13, 14 and 15 are resting on the ground 44. This may be accomplished by mounting the starting wheel axle 41 higher than the axles of the other wheels, or as shown by making the diameter of the starting wheels 37 smaller than that of the wheels 12 to 15. It will be observed that the starter wheels 37 may readily be caused to engage the ground by tilting the handle backward or pressing downward on the grips 21 so as to lift the front wheels 14 and 15 from the ground and cause the mower to ride upon the wheels 37 and 12 and 13.

Thereupon, pushing the mower forward in the normal manner or pushing it backwards will cause the wheels 37 to rotate, will cause the rope 32 to wind up upon the reel 38 and to unwind the rope from the drum 31 until the spring 24 is fully wound. When the operator observes by increased opposition to the pushing of the mower that the spring 24 is fully wound he allows the mower to resume its normal position with the wheels 14 and 15 upon the ground by relaxing the downward force upon the hand grips 21. The wheels 37 are then released from engagement with the ground 44 and they release the spring 24 causing it to unwind, causing the shaft 28 through the one-way clutch 29 to engage the motor shaft 17 and rotate the engine 16 causing it to start.

Since the full force of the operator's entire body is available for pushing the mower forward or backwards, and the strength of the leg and back muscles may be utilized for winding up the spring 24, and moreover the required force is reduced by the fact that the energy delivered to the spring may be divided over a number of feet of pushing the mower, a relatively large starting force may be stored in the spring 24 even though the mower is operated by frail persons, women or youths without mechanical aptitude, who have difficulty in starting engines of mowers heretofore available.

Preferably, suitable means are provided for guiding the starter rope 32 between the drum 31 and the reel 38 in order to prevent whipping or abrasion thereof. For example, a tube 45 with flared openings 46 and a polished inner surface may be provided which is secured to the housing of the motor 16 and to the mower deck by means of straps 47. It will be understood that the invention is not limited thereto, however, and does not exclude the use of idler pulleys or the like.

If it is desired to wind up the spring 24 within a relatively short travel distance without requiring much initial force when the operator starts to push the mower, a fast wind up type of reel 48, such as shown in FIG. 5, may be employed. The reel 48 has a V-shaped cross-section so that the radius of the rope layer builds up rapidly and the entire length of the rope 32 can be wound on to the reel 48 while pushing the mower a distance of less than eight feet. Since the initial diameter is no greater than in the case of the reel 38 of FIG. 4, no greater force is required in beginning to push the mower, but as momentum is acquired so that no increased effort is exerted for winding up the rope 32 more rapidly, the diameter of the rope layer increases.

Certain embodiments of the invention and certain methods of operation embraced therein have been shown and particularly described for the purpose of explaining the principle of operation of the invention and showing its application, but it will be obvious to those skilled in the art that many modifications and variations are possible and it is intended, therefore, to cover all such modifications and variations as fall within the scope of the invention.

What is claimed is:

1. An internal-combustion-engine driven rotary mower, which starts when the mower is pushed, comprising in combination with a mower deck having wheels for running on the ground, a handle for pushing the mower deck over the ground, an engine mounted on the deck with a shaft and an impulse engine starter of the spiral spring type connected to the shaft by a one-way clutch, a pair of starter wheels mounted upon the mower deck under the handle normally above the ground but adapted to engage the ground when the handle is tilted down, a rope-winding reel connected to the starter wheels therebetween, a drum connected to said impulse starter, and a rope normally wound upon the drum and having ends fixed to said drum and said reel, respectively, for unwinding from one to the other and vice-versa, whereby with the mower handle tilted and the starter wheels engaging the ground, pushing the mower in either direction winds the rope onto the starter reel and rotates the starter to cock it and cause the engine to be turned over for starting it when the handle is released to release the starter wheels from engagement with the ground.

2. In a rotary mower having an internal combustion engine and a mower blade connected to the engine, a mower deck supporting the engine and having wheels for running on the ground, a handle for pushing the mower deck over the ground, the engine having an impulse starter of a spiral spring type with a one-way clutch for connecting the starter to the engine, a push starter for the engine comprising in combination a pair of starter wheels mounted upon the mower deck under the handle at a position normally above the ground but adapted to engage the ground when the handle is tilted down, a rope winding reel connected to said starter wheels therebetween, a drum connected to said impulse starter, and a rope normally wound upon the drum and having ends fixed to said drum and to said reel, respectively, for unwinding from one on to the other and vice-versa, whereby with the mower handle tilted and the starter wheels engaging the ground, pushing the mower in either direction winds the rope on to the starter reel and rotates the starter to store energy in the starter spring and cause the engine to be turned over for starting when the handle is released to release the starter wheels.

3. In a portable wheel supported tool having an internal combustion driving engine with a shaft, starting apparatus therefor comprising in combination a spring fixed at one end and having a rotatable end, a starter drum connected to the rotatable end, a one-way clutch between said drum and said engine shaft, starter wheel means mounted on said tool at a position normally above the ground but adapted to engage the ground upon tilting the tool, a rope winding reel connected to said starter wheel means and a rope normally wound upon the drum having ends fixed to said drum and said reel, respectively, for unwinding from one on to the other and vice-versa, whereby with the tool tilted and the starting wheel means engaging the ground, pushing the tool in either direction winds the rope onto the starter reel and rotates the drum to store energy in the spring and cause the engine to be turned over for starting when the tool is restored to normal position releasing the starter wheel means from ground engagement.

4. In combination a rotary mower having a deck, an internal combustion engine with a vertical shaft extending through the deck and carrying a mower blade at the lower end thereof, a starter spring mounted upon the engine at the upper end thereof, the spring having two ends, one rotatable with respect to the other, a rotatable drum secured to one end of the spring, the other end of the spring being fixed to the motor housing, a one-way clutch interposed between the engine shaft and the rotatable end of the spring, starter wheel means mounted upon the mower deck normally out of contact with the ground, means for causing said starter wheel means to engage the ground, a rotatable reel secured to the starter wheel means, a rope normally wound upon the drum having opposite ends connected to the drum and the reel and adapted to be unwound from one and on to the other and vice-versa, whereby pushing the mower in either direction with the starter wheel means engaging the ground causes said wheels to rotate unwinding the drum and storing energy in the spring for turning over the engine shaft to start the engine when the starter wheel means are disengaged from the ground.

5. In portable apparatus having ground contacting wheels upon which it normally runs level and an operating engine therefor, the combination comprising a starting rope, an engine starting motor of the spring type having a drum upon which said rope is normally wound and revolving means normally off the ground adapted to engage the ground when the apparatus is tilted for pulling the rope from the drum to rotate it and store energy in the spring starting motor and adapted to disengage the ground and release the rope when the apparatus is running level on its wheels, whereby release of the rope permits the drum to rotate by the stored energy of the spring motor for starting the engine and rewinds the rope upon the drum, the revolving means unwinding the rope from the drum when the apparatus carrying the engine is pushed with said revolving means engaging the ground.

6. Apparatus as in claim 5, wherein the revolving means comprises wheel means normally positioned above the ground and adapted to engage the ground when the apparatus is tilted and a pulley having a pitch which increases from a minimum to a greater value, said pulley being secured to said wheel means with one end of the rope secured to said pulley at the minimum pitch portion thereof for winding it up at a progressively greater rate of speed and rotating the drum at a progressively greater rate of speed as the apparatus is pushed along the ground.

7. Push starting apparatus for a rotary mower having an internal combustion engine with a windable spring impulse starter, said apparatus comprising in combination with the impulse starter, a drum connected thereto, wheel means engageable and disengageable with the ground, a reel connected to the wheel means, a rope having ends connected to the reel and the drum and wound upon the drum when the starter spring is unwound, whereby pushing the mower in either direction when the wheel means are engaged with the ground unwinds the rope from the drum to the reel and stores energy in the spring for starting the engine when the wheel engaging means are disengaged from the ground to permit unwinding of the spring.

References Cited in the file of this patent

UNITED STATES PATENTS 3,005,449    Wood et al. _____ Oct. 24, 1961

FOREIGN PATENTS 1,245,802    France _____ Oct. 3, 1960